United States Patent
Wu

(10) Patent No.: US 12,128,917 B2
(45) Date of Patent: Oct. 29, 2024

(54) METHOD FOR OUTPUTTING EARLY WARNING INFORMATION, DEVICE, STORAGE MEDIUM AND PROGRAM PRODUCT

(71) Applicant: Apollo Intelligent Connectivity (Beijing) Technology Co., Ltd., Beijing (CN)

(72) Inventor: Junfa Wu, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 216 days.

(21) Appl. No.: 17/721,411

(22) Filed: Apr. 15, 2022

(65) Prior Publication Data

US 2022/0234605 A1 Jul. 28, 2022

(30) Foreign Application Priority Data

Apr. 16, 2021 (CN) .......................... 202110412523.7

(51) Int. Cl.
*B60W 50/14* (2020.01)
*B60K 35/00* (2024.01)
(Continued)

(52) U.S. Cl.
CPC ............. *B60W 50/14* (2013.01); *B60K 35/00* (2013.01); *B60W 40/04* (2013.01); (Continued)

(58) Field of Classification Search
CPC ................. B60W 50/14; B60W 40/04; B60W 2050/143; B60W 2050/146; (Continued)

(56) References Cited

U.S. PATENT DOCUMENTS

| 6,035,053 A * | 3/2000 | Yoshioka ........... B60K 31/0008 |
| | | 382/104 |
| 11,427,195 B1 * | 8/2022 | Pertsel .................... B60L 58/12 |

(Continued)

FOREIGN PATENT DOCUMENTS

| CN | 102780869 A | 11/2012 |
| CN | 102951159 A | 3/2013 |

(Continued)

OTHER PUBLICATIONS

Search Report of corresponding European Application No. 22168663, dated Sep. 14, 2022, 11 pages.

(Continued)

*Primary Examiner* — Chico A Foxx
(74) *Attorney, Agent, or Firm* — Tucker Ellis LLP

(57) ABSTRACT

The present disclosure discloses a method for outputting early warning information, a device, a storage medium and a program product, including: acquiring, according to vehicle traveling information, both a preset sensing frame rate and a preset early warning frame rate corresponding to the vehicle traveling information; performing, according to the preset sensing frame rate, sensing processing on acquired sensor data to obtain a sensing result; and determining, according to the sensing result and the preset early warning frame rate, a target early warning frame rate, and performing, according to the target early warning frame rate, early warning processing on the sensing result to obtain an early warning result of the vehicle. Both the number of times of processing the sensor data and the number of times of processing the sensing result can be reduced, and the early warning information is output based on the driving assistance system.

17 Claims, 6 Drawing Sheets

(51) Int. Cl.
  *B60W 40/04* (2006.01)
  *G06V 20/58* (2022.01)
  *H04N 7/01* (2006.01)
  *B60K 35/26* (2024.01)
  *B60K 35/28* (2024.01)
  *B60K 35/29* (2024.01)

(52) U.S. Cl.
  CPC ......... *G06V 20/584* (2022.01); *H04N 7/0127* (2013.01); *B60K 35/265* (2024.01); *B60K 35/28* (2024.01); *B60K 35/29* (2024.01); *B60K 2360/178* (2024.01); *B60K 2360/1868* (2024.01); *B60W 2050/143* (2013.01); *B60W 2050/146* (2013.01); *B60W 2420/403* (2013.01)

(58) Field of Classification Search
  CPC ........... B60W 2420/403; G06V 20/584; B60K 35/00; B60K 2360/178; B60K 35/28; B60K 2360/1868; B60K 35/29; B60K 35/265; H04N 7/0127
  See application file for complete search history.

(56) References Cited

U.S. PATENT DOCUMENTS

| | | | |
|---|---|---|---|
| 2003/0169902 A1* | 9/2003 | Satoh | G08G 1/166 348/E7.086 |
| 2005/0018049 A1 | 1/2005 | Falk | |
| 2006/0077049 A1 | 4/2006 | Kato et al. | |
| 2007/0140527 A1* | 6/2007 | Yamamoto | G06V 20/58 382/104 |
| 2013/0093582 A1 | 4/2013 | Walsh et al. | |
| 2014/0354450 A1* | 12/2014 | Takahashi | G01S 13/931 340/904 |
| 2018/0137376 A1* | 5/2018 | Suzuki | G08G 1/167 |
| 2019/0101916 A1* | 4/2019 | Sen | B60W 60/0059 |
| 2020/0079369 A1* | 3/2020 | Kuehnle | G06V 10/82 |
| 2020/0294401 A1 | 9/2020 | Kerecsen | |
| 2021/0101609 A1 | 4/2021 | Kim et al. | |
| 2021/0107505 A1 | 4/2021 | Matsunaga et al. | |
| 2023/0046484 A1* | 2/2023 | Fang | B60K 35/50 |

FOREIGN PATENT DOCUMENTS

| | | | | |
|---|---|---|---|---|
| CN | 104580969 A | | 4/2015 | |
| CN | 109017802 A | | 12/2018 | |
| CN | 110493521 A | | 11/2019 | |
| CN | 111307170 A | | 6/2020 | |
| CN | 111915915 A | * | 11/2020 | ........ B60W 50/0097 |
| CN | 112435469 A | | 3/2021 | |
| EP | 3961582 A2 | * | 3/2022 | ......... G06K 9/00798 |
| JP | 2003-259361 A | | 9/2003 | |
| JP | 2007-172035 A | | 7/2007 | |
| JP | 2007-218655 A | | 8/2007 | |
| JP | 2009-205386 A | | 9/2009 | |
| JP | 2017-043197 A | | 3/2017 | |
| JP | 2017-62575 A | | 3/2017 | |
| JP | 2019-032744 A | | 2/2019 | |
| WO | 2015/184578 A1 | | 12/2015 | |

OTHER PUBLICATIONS

Office Action of corresponding Chinese Application No. 202110412523.7, dated May 18, 2023, 13 pages.

Notice of Reasons for Refusal of corresponding Japanese Application No. 2022-055268 dated Mar. 3, 2023, 8 pages.

* cited by examiner

METHOD FOR OUTPUTTING EARLY WARNING INFORMATION, DEVICE, STORAGE MEDIUM AND PROGRAM PRODUCT

CROSS-REFERENCE TO RELATED APPLICATIONS

The present application claims priority to Chinese Patent Application No. 202110412523.7, which was filed on Apr. 16, 2021 and titled "METHOD FOR OUTPUTTING EARLY WARNING INFORMATION, DEVICE, STORAGE MEDIUM AND PROGRAM PRODUCT", the entirety of which is incorporated herein by reference.

TECHNICAL FIELD

The present disclosure relates to driving assistance technologies in artificial intelligence technologies, and in particular, to a method for outputting early warning information, a device, a storage medium and a program product.

BACKGROUND

At present, many vehicles are provided with driving assistance systems, which can sense an environment around the vehicles and give early warnings to users.

A sensing module in the driving assistance system performs real-time sensing on sensor data, and an early warning module performs real-time early warning processing on a sensing result of the sensing module to obtain an early warning result.

In order to improve safety of the driving assistance system, the driving assistance system acquires information from a sensor in real time and processes the acquired information in real time, resulting in more performance loss of the driving assistance system.

SUMMARY

According to a first aspect of the present disclosure, there is provided a method for outputting early warning information based on a driving assistance system, including:

acquiring, according to vehicle traveling information, both a preset sensing frame rate and a preset early warning frame rate corresponding to the vehicle traveling information;

performing, according to the preset sensing frame rate, sensing processing on acquired sensor data to obtain a sensing result; where the sensor data is used for determining an environment around a vehicle; and determining, according to the sensing result and the preset early warning frame rate, a target early warning frame rate, and performing, according to the target early warning frame rate, early warning processing on the sensing result to obtain an early warning result of the vehicle, where the early warning result is used for outputting early warning information.

According to a second aspect of the present disclosure, there is provided an electronic device, including:

at least one processor; and a memory communicatively connected with the at least one processor; where the memory stores instructions executable by the at least one processor, and the instructions are executed by the at least one processor to enable the at least one processor to perform the method for outputting early warning information based on the driving assistance system according to the first aspect.

According to a third aspect of the present disclosure, there is provided a non-transitory computer-readable storage medium storing computer instructions, where the computer instructions are used to cause a computer to perform the method for outputting early warning information based on the driving assistance system according to the first aspect.

It should be understood that content described in this section is neither intended to identify a key or important feature of embodiments of the present disclosure, nor to limit the scope of the present disclosure. Other features of the present disclosure will become easy to understand through the following description.

BRIEF DESCRIPTION OF DRAWINGS

Figures are used for better understanding of the present solution, and do not constitute a limitation to the present disclosure. Among them.

DESCRIPTION OF EMBODIMENTS

Exemplary embodiments of the present disclosure are illustrated below in conjunction with figures, where various details of the embodiments of the present disclosure are included to facilitate understanding, and they should be considered as merely exemplary. Therefore, those of ordinary skill in the art should realize that various changes and modifications may be made to the embodiments described herein without departing from the scope and the spirit of the present disclosure. Likewise, for clarity and conciseness, descriptions of well-known functions and structures are omitted in the following description.

The present disclosure provides a method for outputting early warning information, a device, a storage medium and a program product, so as to reduce performance loss of a driving assistance system.

The method for outputting early warning information, the device, the storage medium and the program product provided in the present disclosure include: acquiring, according to vehicle traveling information, both a preset sensing frame rate and a preset early warning frame rate corresponding to the vehicle traveling information; performing, according to the preset sensing frame rate, sensing processing on acquired sensor data to obtain a sensing result; and determining, according to the sensing result and the preset early warning frame rate, a target early warning frame rate, and performing, according to the target early warning frame rate, early warning processing on the sensing result to obtain an early warning result of the vehicle. By adjusting the frame rate for processing the sensor data and the frame rate for processing the sensing result, the method for outputting early warning information, the device, the storage medium and the program product provided in the present disclosure can reduce a number of times of processing the sensor data, and can also reduce a number of times of processing the sensing result, thereby outputting early warning information based on the driving assistance system.

At present, a vehicle may be provided with a driving assistance system, and through the driving assistance system, the vehicle thus may travel automatically without human control.

Figure 1:
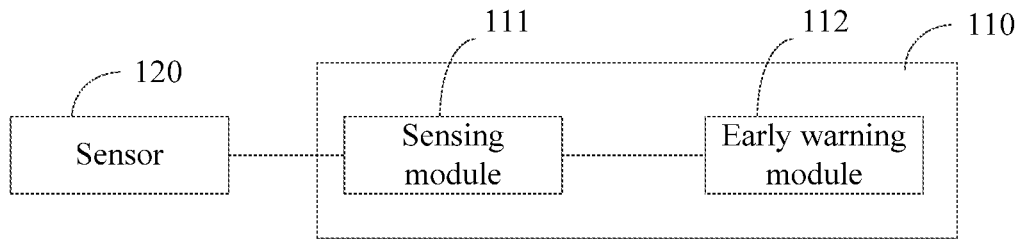
FIG. 1 is a schematic diagram of a driving assistance system shown in an illustrative embodiment.

FIG. 1 is a schematic diagram of a driving assistance system shown in an illustrative embodiment.

As shown in FIG. 1, a driving assistance system 110 may be provided with a sensing module 111, and may also be provided with an early warning module 112.

A vehicle may be provided with sensors 120, which may be devices such as radars, cameras, etc. These sensors 120 may send sensor data to the sensing module 111 in real time, the sensing module 111 processes the received sensor data in real time, obtains sensing results, and then sends the sensing results to the early warning module 112, so that the early warning module 112 may process the sensing results in real time to obtain an early warning result.

The driving assistance system 110 may specify a driving strategy according to the early warning result to control traveling of the vehicle.

The sensing module 111 and the early warning module 112 process the received data in real time, resulting in more performance loss of the driving assistance system.

In order to solve the above technical problem, in the solution provided in the present disclosure, frame rates both for the sensing module and the early warning module processing data are reduced according to actual traveling situation of the vehicle, and then the sensing module and the early warning module are controlled to reduce an amount of data processing based on the actual traveling situation, thereby reducing the performance loss of the driving assistance system.

Figure 2:
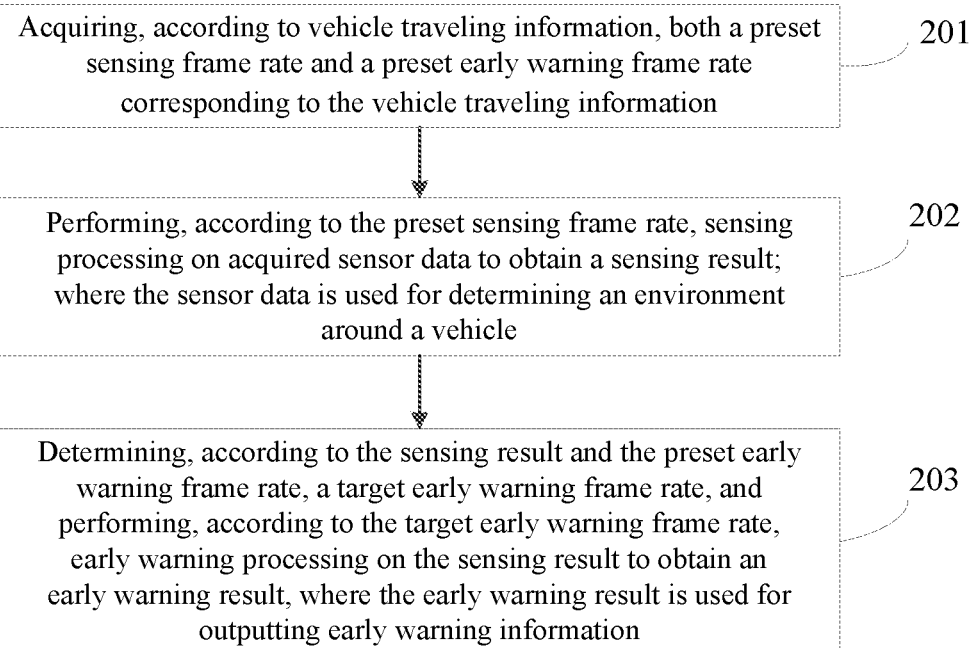
FIG. 2 is a schematic flowchart of a method for outputting early warning information based on a driving assistance system shown in an illustrative embodiment of the present disclosure.

FIG. 2 is a schematic flowchart of a method for outputting early warning information based on a driving assistance system shown in an illustrative embodiment of the present disclosure.

As shown in FIG. 2, a method for outputting early warning information based on a driving assistance system provided in the present disclosure includes:

step 201, acquiring, according to vehicle traveling information, both a preset sensing frame rate and a preset early warning frame rate corresponding to the vehicle traveling information.

Specifically, the method provided in the present disclosure may be performed by an electronic device with a computing capability, and the electronic device may be, for example, a vehicle-mounted terminal. The vehicle-mounted terminal may be provided with a driving assistance system, and the vehicle-mounted terminal may operate the driving assistance system, and then control traveling of the vehicle based on the driving assistance system.

Furthermore, the electronic device may acquire vehicle traveling information, which may specifically include information of the vehicle itself, such as vehicle speed. Therefore, the electronic device can acquire a preset sensing frame rate and a preset early warning frame rate based on the vehicle speed of the vehicle. The vehicle traveling information may also include information of a road where the vehicle is located, which may include, such as, road type, road speed limiting information, etc. Therefore, the electronic device can acquire a preset sensing frame rate and a preset early warning frame rate based on information of an actual road where the vehicle is located.

In practical applications, a corresponding relationship between vehicle traveling information and a preset sensing frame rate may be set in the electronic device in advance, and a corresponding relationship between vehicle traveling information and a preset early warning frame rate may also be set in advance. In this way, the electronic device can search for, according to the acquired vehicle traveling information, the preset sensing frame rate and the preset early warning frame rate in corresponding relationships set in advance.

For example, the driving assistance system provided in the electronic device may be provided with an intelligent frame limiting module, so that the electronic device can utilize the intelligent frame limiting module to acquire the preset sensing frame rate and the preset early warning frame rate.

The intelligent frame limiting module may be connected, separately, with a sensing module and an early warning module, so as to output intelligently adjusted frame rates to the sensing module and the early warning module.

Step 202, performing, according to the preset sensing frame rate, sensing processing on acquired sensor data to obtain a sensing result; where the sensor data is used for determining an environment around a vehicle.

Specifically, the electronic device may acquire sensor data. For example, after collecting data, a sensor may send the collected data to the electronic device; for another example, the electronic device may send a data acquiring request to the sensor, so that the sensor send sensor data to the electronic device.

Sensor data is used for determining an environment around a vehicle; for example, the electronic device may process the sensor data to learn about the environment around the vehicle.

Furthermore, the driving assistance system provided in the electronic device may also be provided with a sensing module, which may be used by the electronic device to perform sensing processing on acquired sensor data, and then to obtain a sensing result.

In practical applications, the electronic device may perform sensing processing on the acquired sensor data according to the preset sensing frame rate. Therefore, it is not necessary to process, in real time, each frame of the acquired sensor data, and early warning information can be output based on the driving assistance system.

The electronic device may receive sensor data sent to it by the sensor in real time. For example, the electronic device may receive continuous multiple frames of sensor data. For example, frame numbers of the sensor data are 0, 1, 2 . . . n.

Specifically, when processing the sensor data, the electronic device may process part of the sensor data according to the preset sensing frame rate, rather than process each frame of the sensor data. For example, a number of interval N may be determined according to the preset sensing frame rate, and then the electronic device may process one frame of the sensor data every N frames, and obtain a sensing result.

For example, the sensor sends, at an original frame rate, sensor data to the electronic device in real time, with the frame numbers being 0, 1, 2 . . . n, respectively. The electronic device may determine the sensor data required to be processed according to the preset sensing frame rate, for example, frame numbers of the sensor data required to be processed are 0, 5, 10 . . . etc.

Furthermore, when specifically processing the sensor data, the electronic device may determine, according to the sensor data, information of an obstacle around the vehicle, such as distance from an obstacle to the vehicle, type of an obstacle, etc.

In this way, an amount of calculation caused by the electronic device when processing the sensor data can be reduced, and then performance loss caused by the electronic device when processing the sensor data can be reduced.

Step 203, determining, according to the sensing result and the preset early warning frame rate, a target early warning frame rate, and performing, according to the target early warning frame rate, early warning processing on the sensing result to obtain an early warning result, where the early warning result is used for outputting early warning information.

In practical applications, the driving assistance system provided in the electronic device may also include an early warning module, which may process the sensing result to obtain an early warning result.

The electronic device may specifically adjust, according to the sensing result, the preset early warning frame rate acquired in advance to obtain a target early warning frame rate.

Specifically, the preset early warning frame rate is an early warning frame rate acquired according to current vehicle traveling information. For example, when a vehicle speed is fast, an environment around the vehicle also changes quickly, therefore a preset early warning frame rate acquired by the electronic device is also relatively large, so that the electronic device can give an early warning for the current traveling environment of the vehicle. For another example, when the vehicle is traveling on a road with a low limiting speed, an environment around the vehicle changes slowly, and a preset early warning frame rate acquired by the electronic device is also relatively small, thereby reducing the performance loss caused by the driving assistance system when giving an early warning.

Furthermore, in order to not only be able to give timely safe early warnings, but also be able to reduce the number of times the driving assistance system processes the sensing result, so as to reduce the performance loss caused by the driving assistance system when giving an early warning, in the solution provided in the present disclosure, the preset early warning frame rate is further adjusted according to the sensing result to obtain the target early warning frame rate.

In practical applications, the sensing result is used for characterizing information of the environment around the vehicle, such as information of an obstacle around the vehicle, etc. Therefore, the electronic device may determine whether an early warning is required according to specific information included in the sensing result. If the sensing result does not include information that will incur an early warning, the preset early warning frame rate may be reduced; if the sensing result includes information that will incur an early warning, the preset early warning frame rate may be increased.

The electronic device may dynamically adjust the acquired preset early warning frame rate according to the sensing result. For example, if there is an obstacle at a position being close to the vehicle, the preset early warning frame rate may be increased to obtain a high target early warning frame rate, thereby increasing the number of times of processing the sensing result, and then obtaining the early warning result of the vehicle in time. If there is no moving obstacle around the vehicle, the preset early warning frame rate may be reduced to obtain a low target early warning frame rate, thereby reducing the number of times of processing the sensing result, and reducing the performance loss.

Specifically, the electronic device may perform early warning processing on the sensing result according to the adjusted target early warning frame rate, so as to obtain the early warning result. For example, it may be determined, according to the sensing result, whether there is an obstacle that affects the traveling of the vehicle in front of the vehicle. For another example, it may be determined, according to the sensing result, whether there is a signal light that will affect the traveling of the vehicle in front of the vehicle.

In an implementation, the driving assistance system may be provided with multiple sensing modules and multiple early warning modules. Different sensing modules may be used for outputting sensing information of different kinds of articles, and different early warning modules may generate early warning results for different articles. In this case, the method provided in the present disclosure can determine preset sensing frame rates of respective sensing modules and target early warning frame rates of respective early warning modules.

Figure 3:
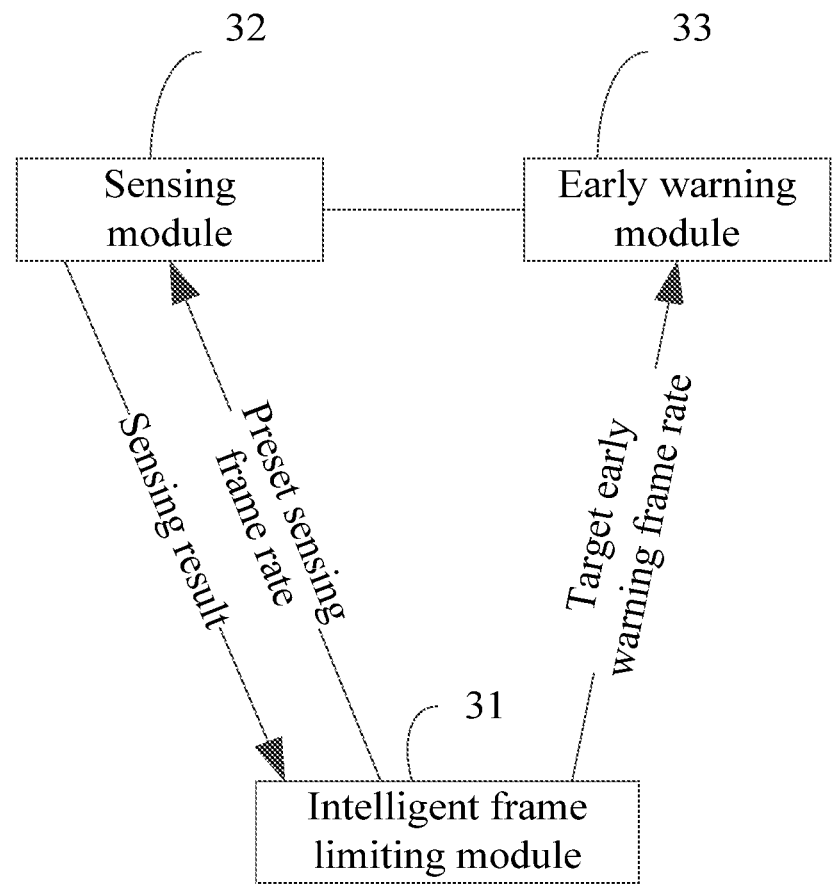
FIG. 3 is a schematic diagram of frame rate adjusting shown in an illustrative embodiment of the present disclosure.

FIG. 3 is a schematic diagram of frame rate adjusting shown in an illustrative embodiment of the present disclosure.

As shown in FIG. 3, an intelligent frame limiting module 31 may be used to acquire a preset sensing frame rate and a preset early warning frame rate. The intelligent frame limiting module 31 may send the acquired preset sensing frame rate to a sensing module 32, so that the sensing module 32 performs, according to the preset sensing frame rate, sensing processing on acquired sensor data to obtain a sensing result.

The sensing module 32 may send the sensing result to the intelligent frame limiting module 31, and the intelligent frame limiting module 31 utilizes the sensing result to adjust the preset early warning frame rate, so as to obtain a target early warning frame rate.

The intelligent frame limiting module 31 may send the determined target early warning frame rate to an early warning module 33, and the sensing module 32 may also send the sensing result to the early warning module 33. The early warning module 33 can utilize the received target early warning frame rate to process the sensing result, so as to obtain an early warning result.

The early warning result is used for outputting early warning information. For example, the electronic device may judge whether an early warning is required according to the early warning result; if required, the early warning information may be output by way of voice or picture, such as broadcasting a voice message of "a preceding vehicle is going to start up", so as to give an effective early warning to a driver.

The method for outputting early warning information based on the driving assistance system provided in the present disclosure includes: acquiring, according to vehicle traveling information, both a preset sensing frame rate and a preset early warning frame rate corresponding to the vehicle traveling information; performing, according to the preset sensing frame rate, sensing processing on acquired sensor data to obtain a sensing result; determining, according to the sensing result and the preset early warning frame rate, a target early warning frame rate, and performing, according to the target early warning frame rate, early warning processing on the sensing result to obtain an early warning result. By adjusting the frame rate for processing the sensor data and the frame rate for processing the sensing result, the method provided in the present disclosure can reduce the number of times of processing the sensor data, and can also reduce the number of times of processing the sensing result, thereby outputting early warning information based on the driving assistance system.

Figure 4:
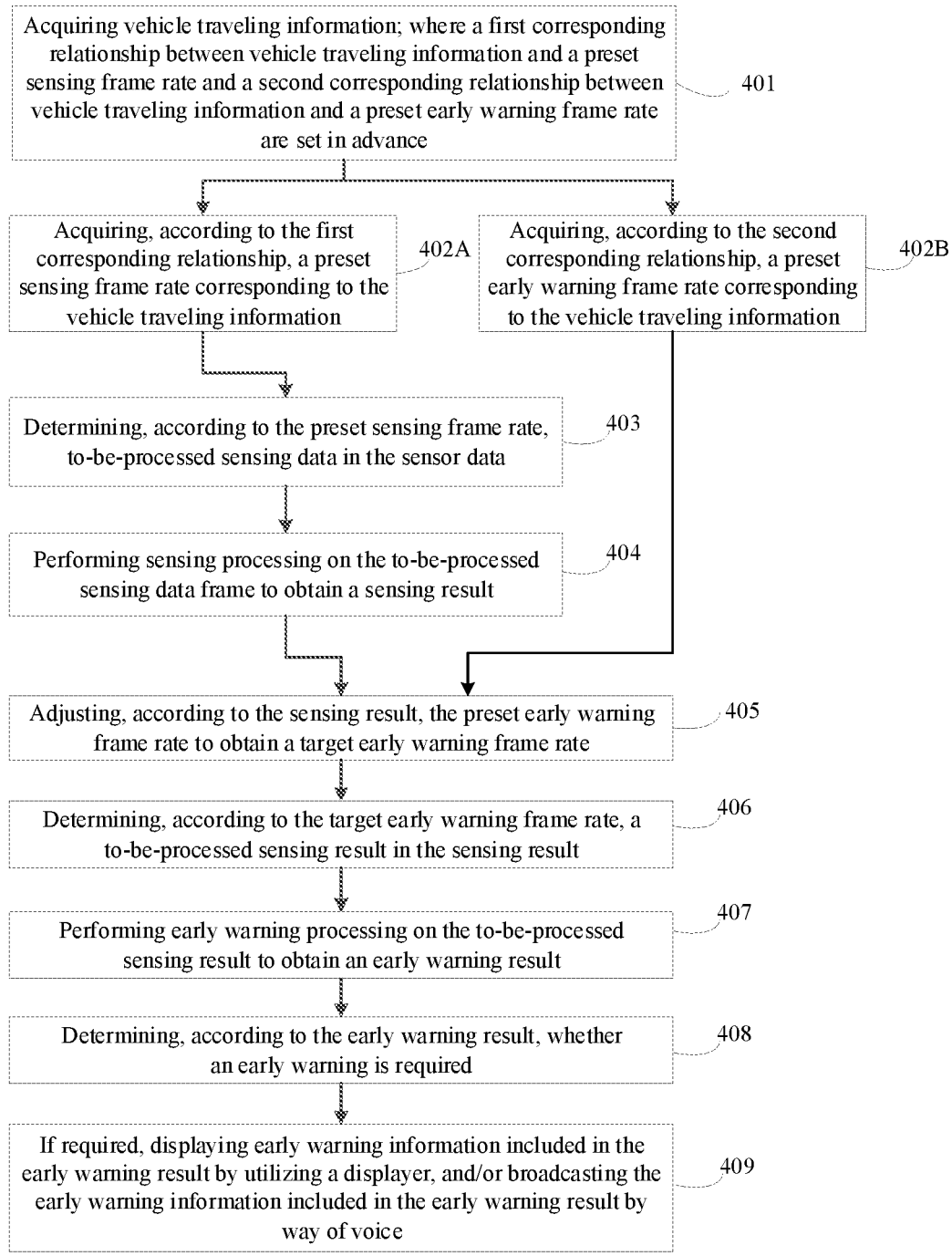
FIG. 4 is a schematic flowchart of a method for outputting early warning information based on a driving assistance system shown in another illustrative embodiment of the present disclosure.

FIG. 4 is a schematic flowchart of a method for outputting early warning information based on a driving assistance system shown in another illustrative embodiment of the present disclosure.

As shown in FIG. 4, a method for outputting early warning information based on a driving assistance system provided in the present disclosure includes:

step 401, acquiring vehicle traveling information; where a first corresponding relationship between vehicle traveling information and a preset sensing frame rate and a second corresponding relationship between vehicle traveling information and a preset early warning frame rate are set in advance.

The method provided in the present disclosure may be performed by an electronic device with a computing capability, and the electronic device may be, for example, a vehicle-mounted terminal. The vehicle-mounted terminal may be provided with a driving assistance system, and the vehicle-mounted terminal may operate the driving assistance system, and then control traveling of the vehicle based on the driving assistance system.

Specifically, both the first corresponding relationship between the vehicle traveling information and the preset sensing frame rate and the second corresponding relationship between the vehicle traveling information and the preset early warning frame rate are set in the electronic device in advance.

In both the first corresponding relationship and the second corresponding relationship, a variety of vehicle traveling information may be set, such as vehicle speed, lane type, and lane speed limiting information, etc. In the first corresponding relationship and the second corresponding relationship, multiple preset sensing frame rates and multiple preset early warning frame rates may also be set; for example, a preset sensing frame rate used for sensing a pedestrian, and a preset sensing frame rate used for sensing a vehicle; for another example, a preset early warning frame rate used for preceding vehicle starting up early warning, for example a preset early warning frame rate used for signal light early warning.

Corresponding relationships between different vehicle traveling information and preset sensing frame rates and corresponding relationships between different vehicle traveling information and preset early warning frame rates may be determined based on prior knowledge. For example, a preset sensing frame rate corresponding to a highway may be high, and a preset sensing frame rate corresponding to a low-level highway may be low.

If the driving assistance system is provided with multiple sensing modules, preset sensing frame rates corresponding to respective sensing modules may be set in the first corresponding relationship. If the driving assistance system is provided with multiple early warning modules, preset early warning frame rates corresponding to respective early warning modules may be set in the second corresponding relationship.

If the vehicle traveling information includes road information, the road information includes any of the following information:

speed limiting information, road type information, road curvature information, slope information, and signal light information.

Specifically, if road information is different, environments in which a vehicle is located are also different. Therefore, the electronic device may acquire the preset sensing frame rate and the preset early warning frame rate according to the road information, so as to perform sensing and early warning based on reasonable frame rates.

For example, when there is no traffic light on a highway, a preset signal light early warning frame rate corresponding to the highway thus may be low. Then, when a road type included in traveling information of a vehicle is a highway, the electronic device can use a low frame rate to give a signal light early warning, thereby reducing performance loss of the driving assistance system.

For another example, when speed limiting information is low, a preset sensing frame rate may also be relatively low. For another example, when a road curvature is large, a large route deviation early warning frame rate may be set in advance. For another example, when a road slope is large, a large vehicle sliding early warning frame rate may be set in advance. For another example, when there are many signal lights on a road, a large signal light sensing frame rate and a large signal light early warning frame rate may be set in advance.

In an implementation, the second corresponding relationship includes any one of the following information:

a corresponding relationship between speed limiting information and a preset early warning frame rate used for lane deviation early warning, a corresponding relationship between a vehicle speed and a preset early warning frame rate used for lane deviation early warning, a corresponding relationship between a road type information and a preset early warning frame rate used for lane deviation early warning, and a corresponding relationship between a road type information and a preset early warning frame rate used for preceding vehicle starting up early warning.

In another implementation, the first corresponding relationship includes any one of the following information:

a corresponding relationship between road type information and a preset sensing frame rate used for pedestrian detecting, and a corresponding relationship between signal light information and a preset sensing frame rate used for pedestrian detecting.

Furthermore, when acquiring road information, the electronic device may acquire positioning information of the vehicle, and determine, according to the positioning information, a road where the vehicle is located; and then determine the road information according to both the road where the vehicle is located and a preset high-precision map.

In practical applications, the high-precision map may record specific information of respective roads, such as road curvature, slope, position of a signal light provided on a road, road type, and speed limiting information, etc. The electronic device may determine, according to the positioning information of the vehicle, a position where the vehicle is actually located, and then match it to a corresponding road, and determine specific information of the road in conjunction with the high-precision map.

Since the high-precision map includes relatively complete road information, the electronic device thus can learn about road situation in advance. For example, when a vehicle travels to a 500-meter position of a road, the electronic device can acquire information of an 800-meter position of the road, and then adjust the sensing frame rate and the early warning frame rate in advance to avoid missing important environmental information.

Step 402A, acquiring, according to the first corresponding relationship, a preset sensing frame rate corresponding to the vehicle traveling information.

Step 402B, acquiring, according to the second corresponding relationship, a preset early warning frame rate corresponding to the vehicle traveling information.

Specifically, the electronic device may acquire, respectively, the preset sensing frame rate and the preset early warning frame rate corresponding to the vehicle traveling information in the first corresponding relationship and the second corresponding relationship.

Furthermore, if the vehicle traveling information includes a variety of information, such as road type and vehicle speed, the electronic device may acquire, in conjunction with the variety of information, the preset sensing frame rate and the preset early warning frame rate in the first corresponding relationship and the second corresponding relationship.

In practical applications, if the driving assistance system is provided with multiple sensing modules and/or early warning modules, the electronic device may acquire, in conjunction with the vehicle traveling information, multiple preset sensing frame rates and/or multiple preset early warning frame rates in the first corresponding relationship and the second corresponding relationship.

In this implementation, based on preset corresponding relationships, both the frame rate used by the driving assistance system to process the sensor data and the frame rate used by the driving assistance system to process the sensing result may be dynamically adjusted, thereby reducing the performance loss of the driving assistance system.

Step 403, determining, according to the preset sensing frame rate, to-be-processed sensing data in the sensor data.

A sensor may send, at an original frame rate, sensor data to the electronic device frame by frame, for example, frame numbers of the sensor data received by the electronic device may be 0, 1, 2, 3 . . . n in sequence. The electronic device may determine, according to the preset sensing frame rate, to-be-processed sensing data that is required to be processed in the received sensor data, thereby reducing the number of times of processing the sensing data, and reducing the performance loss of the driving assistance system.

Specifically, the electronic device may also determine, according to a frame rate for receiving the sensor data and the acquired preset sensing frame rate, frame numbers of the to-be-processed sensing data. For example, if the frame number of the to-be-processed sensing data is N, N*rate2% rate1=0. Rate1 is the frame rate for receiving the sensor data, and rate2 is the preset sensing frame rate. For example, if rate1 is 10 hz and rate2 is 2 hz, the frame numbers of the to-be-processed sensing data are 0, 5, 10 . . . in sequence.

In this way, the electronic device performs sensing processing only on part of the received sensor data.

Step 404, performing sensing processing on the to-be-processed sensing data frame to obtain a sensing result.

Furthermore, the electronic device may perform sensing processing on the determined to-be-processed sensing data. For example, information of an environment around the vehicle may be determined according to the to-be-processed sensing data.

In practical applications, the to-be-processed sensing data may include, for example, radar data, image data collected through a camera, etc. The electronic device may process these data, identify an obstacle around the vehicle, and then obtain a sensing result.

Step 405, adjusting, according to the sensing result, the preset early warning frame rate to obtain a target early warning frame rate.

The electronic device may further adjust, according to the determined sensing result, the acquired preset early warning frame rate, thereby reducing the performance loss of the driving assistance system on the premise of satisfying timely early warning.

Specifically, if the sensing result does not include a sensed object that may incur an early warning, the electronic device may reduce the corresponding preset early warning frame rate to obtain the target early warning frame rate. If the sensing result includes a sensed object that may incur an early warning, the electronic device may increase the corresponding preset early warning frame rate to obtain the target early warning frame rate, so as to ensure that the vehicle can give an early warning in time.

Furthermore, the preset early warning frame rate may include a frame rate used for obstacle early warning; for example, the driving assistance system is provided with an obstacle early warning module, and the obstacle early warning module may process the sensing result based on the frame rate used for obstacle early warning, and determine an early warning result; for example, the sensing result are processed based on a target frame rate used for obstacle early warning.

In practical applications, if a distance, included in the sensing result, from an moving sensed object to the vehicle is less than a preset value, it indicates that an obstacle being close to the vehicle exists around the vehicle, then the electronic device may increase the frame rate used for obstacle early warning to obtain a target early warning frame rate used for obstacle early warning. Therefore, the electronic device can give an obstacle early warning according to the target early warning frame rate used for obstacle early warning.

In this implementation, when an obstacle is close to the vehicle, the number of times of performing obstacle early warning processing, by the vehicle, on the sensing result can be increased, and then an early warning can be provided to a driver in time.

If a distance, included in the sensing result, from a moving sensed object to the vehicle is greater than a preset value, it indicates that there is no obstacle being close to the vehicle around the vehicle, and a probability that an obstacle early warning may occur is low. Therefore, the electronic device may reduce the frame rate used for obstacle early warning to obtain a target early warning frame rate used for obstacle early warning.

In this way, in the case that an obstacle is far away, the electronic device can reduce the number of times of performing obstacle early warning processing, by the vehicle, on the sensing result, and then the performance loss of the driving assistance system is reduced.

In practical applications, the preset early warning frame rate may also include a frame rate used for preceding vehicle starting up early warning. For example, the driving assistance system is provided with a preceding vehicle starting up early warning module, and the preceding vehicle starting up early warning module may process the sensing result according to the frame rate used for preceding vehicle starting up early warning, so as to obtain an early warning result of preceding vehicle starting up. For example, the sensing result is processed according to the target frame rate used for preceding vehicle starting up early warning.

If a distance, included in the sensing result, from a position of a preceding vehicle to the vehicle is greater than a starting up early warning preset value, the frame rate used for preceding vehicle starting up early warning is reduced to obtain a target early warning frame rate used for preceding vehicle starting up early warning.

Specifically, if a distance from a position of a preceding vehicle to the vehicle is greater than a starting up early warning preset value, starting up of the preceding vehicle has little effect on traveling of the present vehicle. Even if a corresponding early warning is not issued in time, normal driving of the vehicle will not be affected. Therefore, the frame rate used for preceding vehicle starting up early warning may be reduced. When early warning processing is performed by utilizing the obtained target early warning frame rate used for preceding vehicle starting up early warning, not only normal traveling of the vehicle is not affected, but also the performance loss of the driving assistance system can be reduced.

Furthermore, if a distance, included in the sensing result, from a position of a preceding vehicle to the vehicle is less than a starting up early warning preset value, the frame rate used for preceding vehicle starting up early warning is increased to obtain a target early warning frame rate used for preceding vehicle starting up early warning.

In practical applications, if a distance from a position of a preceding vehicle to the vehicle is less than a starting up early warning preset value, starting up of the preceding vehicle will affect greatly on traveling of the present vehicle, and an early warning may be required. Therefore, the frame rate used for preceding vehicle starting up early warning may be increased. When early warning processing is performed by utilizing the obtained target early warning frame rate used for preceding vehicle starting up early warning, relevant information of the early warning of the preceding vehicle may be output in time, so as to ensure normal operation of the vehicle.

In an implementation, the preset early warning frame rate may also include a frame rate used for signal light early warning. For example, the driving assistance system may be provided with a signal light early warning module, and the signal light early warning module can perform early warning processing on the sensing result based on the frame rate used for signal light early warning, so as to obtain an early warning result. For example, the early warning processing may be performed on the sensing result based on the target frame rate used for signal light early warning.

Specifically, if the sensing result includes signal light information, the frame rate used for signal light early warning is increased to obtain a target early warning frame rate used for signal light early warning.

Furthermore, if it is sensed that there is signal light around the vehicle, such as there is signal light in front of the vehicle, the electronic device may increase the frame rate used for signal light early warning, thereby increasing the number of times of performing early warning processing on the sensing result, so as to obtain the target early warning frame rate used for signal light early warning.

In this way, in the case that there is a signal light in front of the vehicle, the number of times of signal light early warning processing can be increased, so as to trigger an signal light-related early warning in time.

In practical applications, if there is no signal light information in the sensing result, the frame rate used for signal light early warning may be reduced, thereby reducing the number of times of performing signal light early warning by the electronic device, so as to reduce the performance loss of the driving assistance system.

The preset early warning frame rate may also include a frame rate used for lane departure early warning. For example, the driving assistance system may be provided with a lane departure early warning module, and the lane departure early warning module may perform early warning processing on the sensing result based on the frame rate used for lane departure early warning, so as to obtain an early warning result. For example, early warning processing may be performed on the sensing result based on a target frame rate used for lane departure early warning.

Specifically, if the sensing result includes curve road information, the electronic device increases the frame rate used for lane departure early warning to obtain the target early warning frame rate used for lane departure early warning.

Furthermore, if the sensing result includes curve road information, it indicates that there is a curve road situation in front of the vehicle, and a lane departure phenomenon is easy to occur due to the curve road situation. Therefore, the frame rate used for lane departure early warning may be increased, so as to trigger an early warning of relevant situation in time.

If the sensing result does not include curve road information, it indicates that the vehicle is traveling on a straight road. At this point, for the vehicle, a lane departure phenomenon is not easy to occur. Therefore, the frame rate used for lane departure early warning may be reduced, thereby reducing the performance loss of the driving assistance system.

In practical applications, a boundary between a curve road and a straight road may be set in advance. For example, when a degree of curvature is large, it may be considered that there is curve road information, and the frame rate used for lane departure early warning is increased; when the degree of curvature is not large, the vehicle is considered to be traveling on a straight road.

Step 406, determining, according to the target early warning frame rate, a to-be-processed sensing result in the sensing result.

After adjusting the preset early warning frame rate to obtain the target early warning frame rate, the electronic device may determine the to-be-processed sensing result frame in the sensing result. For example, if frame numbers of the sensing result are 0, 1, 2, 3 . . . n in sequence, the electronic device may determine, according to the target early warning frame rate, the to-be-processed sensing result in these sensing results, thereby reducing the number of times of performing early warning processing on the sensing result.

Step 407, performing early warning processing on the to-be-processed sensing result to obtain an early warning result.

Specifically, the electronic device may perform early warning processing on the to-be-processed sensing result to obtain an early warning result.

For example, if frame numbers of the to-be-processed sensing result which is determined, according to the target early warning frame rate, by the electronic device in the sensing result are 0, 5, 10, 15 . . . in sequence, the electronic device may perform early warning processing only on these to-be-processed sensing results, thereby reducing the number of times of early warning processing, and reducing the performance loss of the driving assistance system.

Specifically, if there are multiple early warning modules in the driving assistance system, respective early warning modules may perform early warning processing on the sensing result based on corresponding target early warning frame rates, so as to obtain corresponding early warning results. For example, a signal light early warning module may output a signal light early warning result, and a preceding vehicle starting up early warning module may output a preceding vehicle starting up early warning result.

Step 408, determining, according to the early warning result, whether an early warning is required.

The early warning result may include specific early warning information, for example, a preceding vehicle is going to start up, or a signal light is going to turn red, etc. If the electronic device determines, according to the sensing result, that no early warning is required, information that no early warning is required may be output, or no information is output.

Step 409, if required, displaying early warning information included in the early warning result by utilizing a displayer, and/or broadcasting the early warning information included in the early warning result by way of voice.

Specifically, if the early warning result includes information required to be early warned, the electronic device may display the early warning information through a display screen. For example, an object required to be early warned, such as a pedestrian, a preceding vehicle, and a signal light, etc., may be emphasized on a display screen. It may be displayed by way of highlighting, and an attention box may also be added to the object required to be early warned.

Furthermore, the electronic device may also broadcast the early warning information by way of voice broadcast, thereby prompting a driver of an object which is on the road and to which attention should be paid.

In this implementation, specific early warning information can be output to a user to remind the user to pay attention to a situation involved in the early warning information, so as to ensure that the vehicle can drive smoothly and safely.

Figure 5:
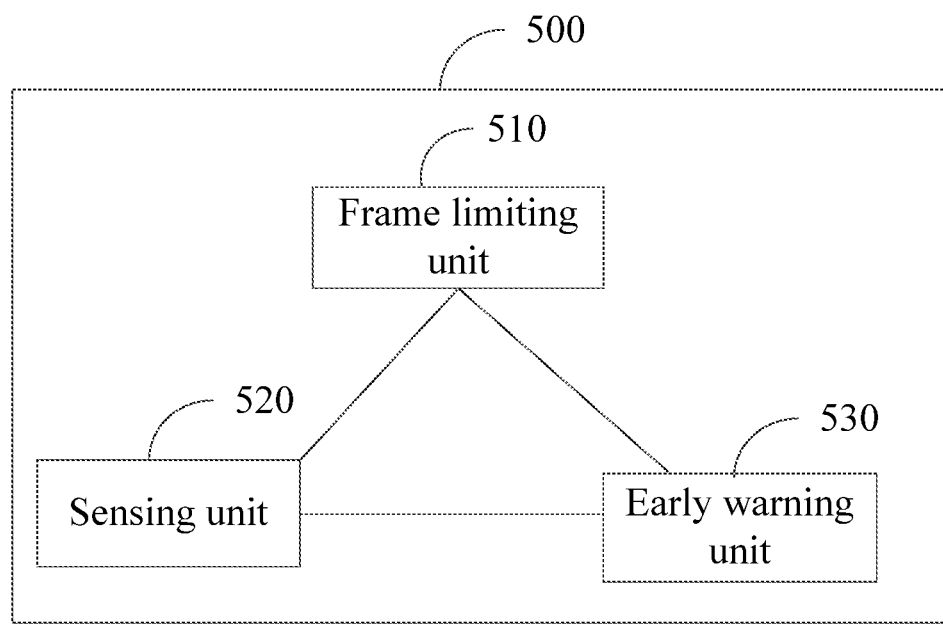
FIG. 5 is a schematic structural diagram of an apparatus for outputting early warning information based on a driving assistance system shown in an illustrative embodiment of the present disclosure.

FIG. 5 is a schematic structural diagram of an apparatus for outputting early warning information based on a driving assistance system shown in an illustrative embodiment of the present disclosure.

As shown in FIG. 5, an apparatus 500 for outputting early warning information based on a driving assistance system provided in the present disclosure includes:
   a frame limiting unit 510, configured to acquire, according to vehicle traveling information, both a preset sensing frame rate and a preset early warning frame rate corresponding to the vehicle traveling information;
   a sensing unit 520, configured to perform, according to the preset sensing frame rate, sensing processing on acquired sensor data to obtain a sensing result; the sensor data is used for determining an environment around the vehicle;
   where the frame limiting unit 510 is further configured to determine, according to the sensing result and the preset early warning frame rate, a target early warning frame rate; and
   an early warning unit 530, configured to perform, according to the target early warning frame rate, early warning processing on the sensing result to obtain an early warning result, where the early warning result is used for outputting early warning information.

The apparatus for outputting early warning information based on the driving assistance system provided in the present disclosure includes: a frame limiting unit, configured to acquire, according to vehicle traveling information, both a preset sensing frame rate and a preset early warning frame rate corresponding to the vehicle traveling information; a sensing unit, configured to perform, according to the preset sensing frame rate, sensing processing on acquired sensor data to obtain a sensing result; where the sensor data is used for determining an environment around the vehicle; where the frame limiting unit is further configured to determine, according to the sensing result and the preset early warning frame rate, a target early warning frame rate; and an early warning unit, configured to perform, according to the target early warning frame rate, early warning processing on the sensing result to obtain an early warning result, where the early warning result is used for outputting early warning information. By adjusting the frame rate for processing the sensor data and the frame rate for processing the sensing result, the apparatus for outputting early warning information based on the driving assistance system provided in the present disclosure can reduce the number of times of processing the sensor data, and can also reduce the number of times of processing the sensing result, thereby outputting the early warning information based on the driving assistance system.

Figure 6:
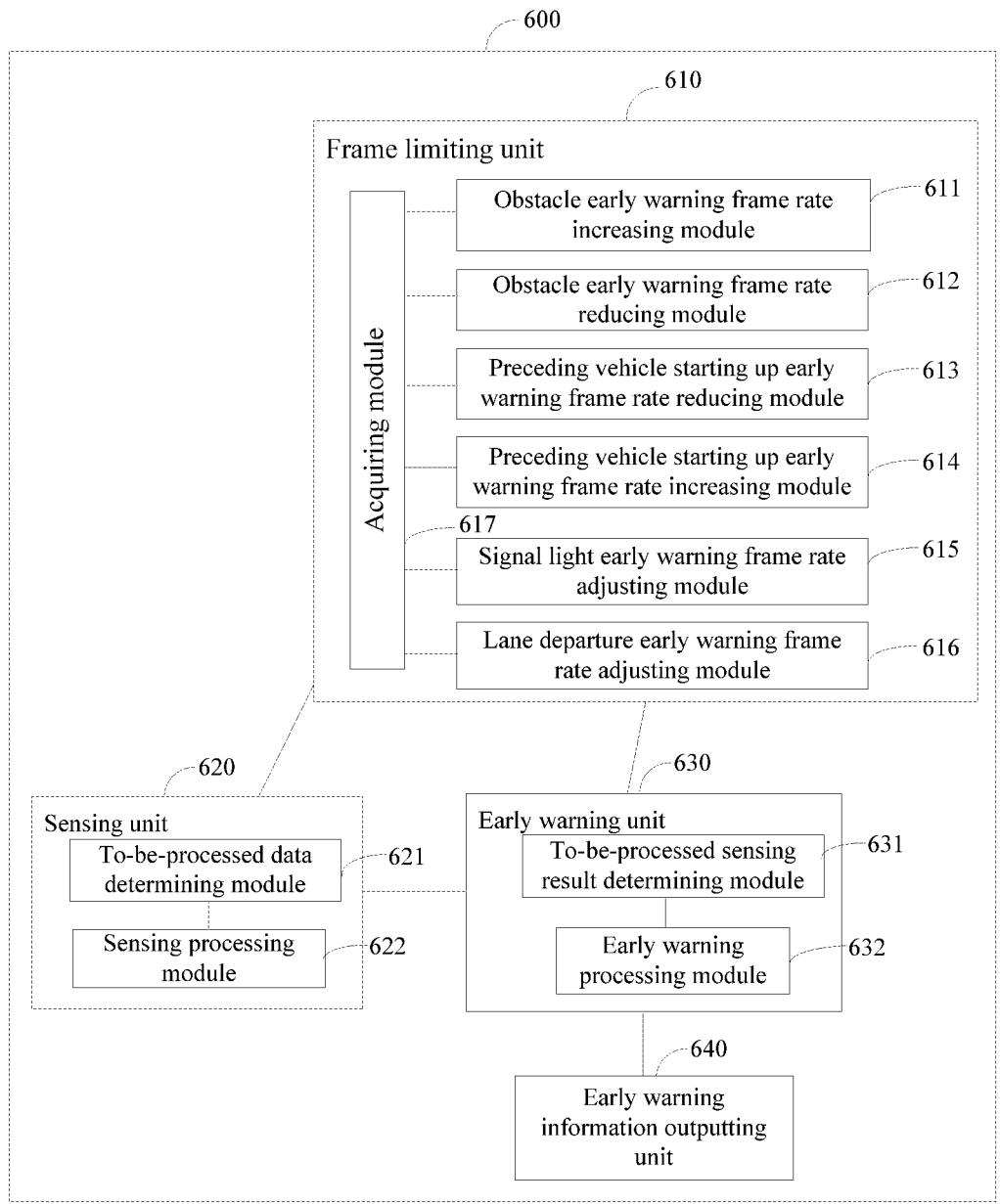
FIG. 6 is a schematic structural diagram of an apparatus for outputting early warning information based on a driving assistance system shown in another illustrative embodiment of the present disclosure.

FIG. 6 is a schematic structural diagram of an apparatus for outputting early warning information based on a driving assistance system shown in another illustrative embodiment of the present disclosure.

As shown in FIG. 6, a frame limiting unit 610 included in an apparatus 600 for outputting early warning information based on a driving assistance system provided in the present disclosure is similar to the frame limiting unit 510 shown in FIG. 5, an sensing unit 620 is similar to the sensing unit 520 shown in FIG. 5, and an early warning unit 630 is similar to the early warning unit 530 shown in FIG. 5.

In an implementation, the frame limiting unit 610 is specifically configured to:
   adjust, according to the sensing result, the preset early warning frame rate to obtain the target early warning frame rate.

In an implementation, the preset early warning frame rate includes a frame rate used for obstacle early warning;
   the frame limiting unit 610 includes an obstacle early warning frame rate increasing module 611, configured to:
   if a distance, included in the sensing result, from a moving sensed object to the vehicle is less than a preset value, increase a frame rate used for obstacle early warning to obtain a target early warning frame rate used for obstacle early warning.

In an implementation, the preset early warning frame rate includes a frame rate used for obstacle early warning;
   the frame limiting unit 610 includes an obstacle early warning frame rate reducing module 612, configured to:
   if a distance, included in the sensing result, from a moving sensed object to the vehicle is greater than a preset value, reduce the frame rate used for obstacle early warning to obtain a target early warning frame rate used for obstacle early warning.

In an implementation, the preset early warning frame rate includes a frame rate used for preceding vehicle starting up early warning;

the frame limiting unit 610 includes a preceding vehicle starting up early warning frame rate reducing module 613, configured to:

if a distance, included in the sensing result, from a position of a preceding vehicle to the vehicle is greater than a starting up early warning preset value, reduce the frame rate used for preceding vehicle starting up early warning to obtain a target early warning frame rate used for preceding vehicle starting up early warning.

In an implementation, the preset early warning frame rate includes a frame rate used for preceding vehicle starting up early warning;

the frame limiting unit 610 includes a preceding vehicle starting up early warning frame rate increasing module 614, configured to:

if a distance, included in the sensing result, from a position of a preceding vehicle to the vehicle is less than a starting up early warning preset value, increase the frame rate used for preceding vehicle starting up early warning to obtain a target early warning frame rate used for preceding vehicle starting up early warning.

In an implementation, the preset early warning frame rate includes a frame rate used for signal light early warning;

the frame limiting unit 610 includes a signal light early warning frame rate adjusting module 615, configured to:

if the sensing result includes signal light information, increase the frame rate used for signal light early warning to obtain a target early warning frame rate used for signal light early warning.

In an implementation, the preset early warning frame rate includes a frame rate used for lane departure early warning;

the frame limiting unit 610 includes a lane departure early warning frame rate adjusting module 616, configured to:

if the sensing result includes curve road information, increase the frame rate used for lane departure early warning to obtain a target early warning frame rate used for lane departure early warning.

In an implementation, both a first corresponding relationship between the vehicle traveling information and the preset sensing frame rate and a second corresponding relationship between the vehicle traveling information and the preset early warning frame rate are set in advance;

the frame limiting unit 610 includes an acquiring module 617, configured to:
- acquire the vehicle traveling information;
- acquire, according to the first corresponding relationship, a preset sensing frame rate corresponding to the vehicle traveling information;
- acquire, according to the second corresponding relationship, a preset early warning frame rate corresponding to the vehicle traveling information.

In an implementation, if the vehicle traveling information includes road information, the road information includes any one of the following information:

speed limiting information, road type information, road curvature information, slope information, and signal light information.

In an implementation, the acquiring module 617 is specifically configured to:

acquire positioning information of the vehicle, and determine, according to the positioning information, a road where the vehicle is located; and determine the road information according to both the road where the vehicle is located and a preset high-precision map.

In an implementation, the sensing unit 620 includes:

a to-be-processed data determining module 621, configured to determine, according to the preset sensing frame rate, to-be-processed sensing data in the sensor data;

a sensing processing module 622, configured to perform sensing processing on the to-be-processed sensing data to obtain the sensing result.

In an implementation, the early warning unit 630 includes:

a to-be-processed sensing result determining module 631, configured to determine, according to the target early warning frame rate, a to-be-processed sensing result in the sensing result;

an early warning processing module 632, configured to perform early warning processing on the to-be-processed sensing result to obtain the early warning result.

In an implementation, the apparatus further includes an early warning information outputting unit 640, configured to:

determine, according to the early warning result, whether an early warning is required; and if an early warning is required, display the early warning information included in the early warning result by utilizing a displayer, and/or broadcast the early warning information included in the early warning result by way of voice.

The present disclosure provides a method for outputting early warning information, a device, a storage medium and a program product, which are applied to driving assistance technologies in artificial intelligence technologies, so as to reduce performance loss of a driving assistance system.

According to an embodiment of the present disclosure, the present disclosure also provides an electronic device and a readable storage medium.

According to an embodiment of the present disclosure, the present disclosure also provides a computer program product, the computer program product includes: a computer program, the computer program is stored in a readable storage medium, at least one processor of an electronic device can read the computer program from the readable storage medium, and the at least one processor executes the computer program to cause the electronic device to perform the solution provided in any of the foregoing embodiments.

Figure 7:
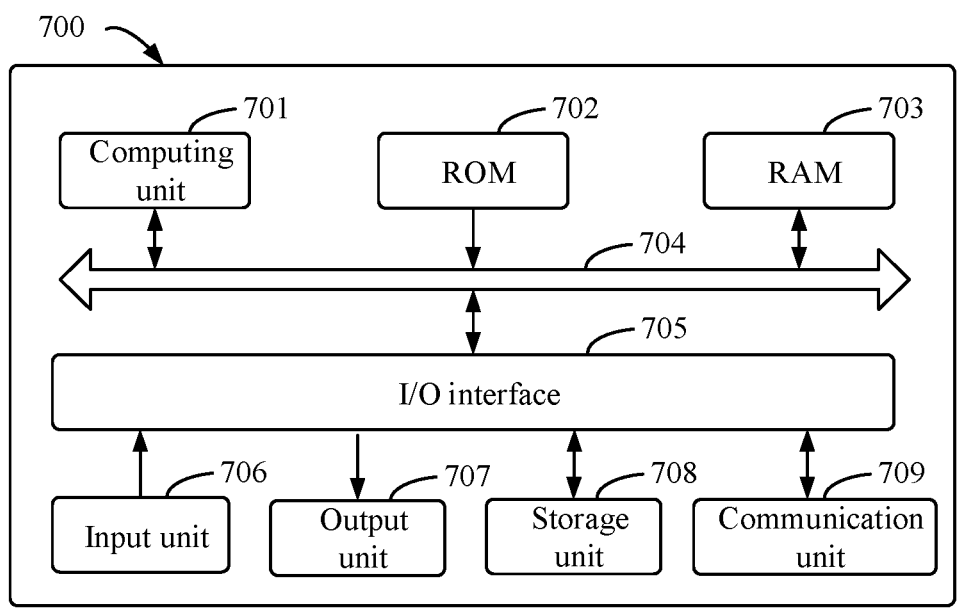
FIG. 7 is a block diagram of an electronic device provided in the present disclosure.

FIG. 7 shows a schematic block diagram of an example electronic device 700 that may be used to implement embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. Components, their connections and relationships, and their functions shown herein are merely examples, and are not intended to limit implementation of the present disclosure described and/or required herein.

As shown in FIG. 7, the electronic device 700 includes a computing unit 701, which may perform, according to a computer program stored in a read-only memory (ROM) 702 or a computer program loaded from a storage unit 708 to a random access memory (RAM) 703, various appropriate actions and processing. In the RAM 703, various programs and data required for operations of the device 700 may also be stored. The computing unit 701, the ROM 702, and the RAM 703 are connected with each other through a bus 704. An input/output (I/O) interface 705 is also connected to the bus 704.

Multiple components in the device 700 are connected to the I/O interface 705, including: an input unit 706, such as a keyboard, a mouse, etc.; an output unit 707, such as various types of displayers, speakers, etc.; the storage unit 708, such as a magnetic disk, an optical disc, etc.; and a communication unit 709, such as a network card, a modem, and a wireless communication transceiver, etc. The communication unit 709 allows the device 700 to exchange information/data with other devices through a computer network such as the Internet and/or various telecommunication networks.

The computing unit 701 may be various general-purpose and/or special-purpose processing assemblies with processing and computing capabilities. Some examples of the computing unit 701 include, but are not limited to, a central processing unit (CPU), a graphics processing unit (GPU), various dedicated artificial intelligence (AI) computing chips, various computing units for running machine learning model algorithms, a digital signal processor (DSP), and any appropriate processor, controller, microcontroller, etc. The computing unit 701 performs various methods and processing described hereinbefore, for example, the method for outputting early warning information based on the driving assistance system. For example, in some embodiments, the method for outputting early warning information based on the driving assistance system may be implemented as computer software programs, which are tangibly contained in a machine-readable medium, such as the storage unit 708. In some embodiments, part or all of computer programs may be loaded into and/or installed on the device 700 via the ROM 702 and/or the communication unit 709. When the computer program is loaded into the RAM 703 and executed by the computing unit 701, one or more steps of the method for outputting early warning information based on the driving assistance system described hereinbefore may be performed. Alternatively, in other embodiments, the computing unit 701 may be configured, in any other appropriate manner (for example, by means of firmware), to perform the method for outputting early warning information based on the driving assistance system.

Various implementations of the system and technology described herein above may be implemented in a digital electronic circuit system, an integrated circuit system, a field programmable gate array (FPGA), an application specific integrated circuit (ASIC), an application-specific standard product (ASSP), a system on chip system (SOC), a complex programmable logic device (CPLD), computer hardware, firmware, software, and/or a combination thereof. These various implementations may include: being implemented in one or more computer programs. The one or more computer programs may be executed and/or interpreted on a programmable system including at least one programmable processor, and the programmable processor may be a special-purpose or general-purpose programmable processor, may receive data and instructions from a storage system, at least one input apparatus, and at least one output apparatus, and transmit data and instructions to the storage system, the at least one input apparatus and the at least one output apparatus.

Program codes used to implement the method of the present disclosure may be written in any combination of one or more programming languages. These program codes may be provided to a processor or a controller of a general-purpose computer, a special-purpose computer, or other programmable data processing apparatuses, so that when the program codes are executed by the processor or the controller, functions/operations specified in a flowchart and/or a block diagram are implemented. The program codes may be executed entirely on a machine, be executed partly on a machine, be executed, as independent software packages, partly on a machine and partly on a remote machine, or be executed entirely on a remote machine or server.

In the context of the present disclosure, a machine-readable medium may be a tangible medium, which may contain or store a program for use by an instruction executing system, apparatus, or device, or for use in conjunction with the instruction executing system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or may be any suitable combination of the foregoing. More specific examples of the machine-readable storage medium would include an electrical connection based on one or more wires, a portable computer disk, a hard disk, a random access memory (RAM), a read-only memory (ROM), an erasable programmable read-only memory (EPROM), an optical fiber, a portable compact disc read-only memory (CD-ROM), an optical storage device, a magnetic storage device, or any appropriate combination of the foregoing.

In order to provide an interaction with a user, the system and technology described herein may be implemented on a computer, and the computer is equipped with: a displaying apparatus for displaying information to the user (for example, a CRT (cathode ray tube) or LCD (liquid crystal display) monitor); as well as a keyboard and a pointing apparatus (for example, a mouse or a trackball), and the user may provide input to the computer through the keyboard and the pointing device. Other types of apparatuses may also be used to provide an interaction with a user; for example, a feedback provided to the user may be any forms of sensory feedbacks (for example, visual feedback, auditory feedback or tactile feedback); and input from the user may be received in any forms (including sound input, voice input or tactile input).

The system and technology described herein may be implemented in a computing system that includes a back-end component (for example, as a data server), or a computing system that includes a middleware component (for example, an application server), or a computing system that includes a front-end component (for example, a user computer with a graphical user interface or a web browser, through which the user may interact with the implementations of the system and technology described herein), or a computing system that includes any combination of such back-end component, middleware component, or front-end component. Components of the system may be connected with each other through digital data communication of any forms or media (for example, a communication network). Examples of the communication network include: local area network (LAN), wide area network (WAN) and the Internet.

A computer system may include a client and a server. The client and the server are generally far away from each other and usually interact through a communication network. A relationship between the client and the server is generated through computer programs that run on corresponding computers and have a client-server relationship with each other. The server may be a cloud server, also known as a cloud computing server or a cloud host, which is a host product in a cloud computing service system, so as to solve defects of high management difficulty and weak business scalability existing in services of a traditional physical host and a virtual private server (VPS). The server may also be a server of a distributed system, or a server combined with a block chain.

It should be understood that various forms of procedures shown above may be used, and steps may be reordered, added or deleted. For example, each of the steps recorded in the present disclosure may be performed in parallel, may also be performed sequentially, may also be performed in a different order, as long as a desired result of the technical solution disclosed in the present disclosure can be achieved, and this is not limited herein.

The above specific implementations do not constitute a limitation to the protection scope of the present disclosure. Those skilled in the art should understand that various modifications, combinations, sub-combinations, and substitutions may be made according to design requirements and other factors. Any modifications, equivalent replacements, improvements and so on made within the spirit and the principles of the present disclosure shall be included in the protection scope of the present disclosure.

What is claimed is:

1. A method for outputting early warning information based on a driving assistance system, comprising:
   acquiring, according to vehicle traveling information, both a preset sensing frame rate and a preset early warning frame rate corresponding to the vehicle traveling information;
   performing, according to the preset sensing frame rate, sensing processing on acquired sensor data to obtain a sensing result; wherein the sensor data is used for determining an environment around a vehicle; and
   determining, according to the sensing result and the preset early warning frame rate, a target early warning frame rate, and performing, according to the target early warning frame rate, early warning processing on the sensing result to obtain an early warning result of the vehicle, wherein the early warning result is used for outputting early warning information;
   wherein the performing, according to the preset sensing frame rate, sensing processing on the acquired sensor data to obtain the sensing result comprises:
   determining, according to the preset sensing frame rate, part of the sensor data as to-be-processed sensing data; and
   performing sensing processing on the to-be-processed sensing data to obtain the sensing result;
   wherein the performing, according to the target early warning frame rate, early warning processing on the sensing result to obtain the early warning result of the vehicle comprises:
   determining, according to the target early warning frame rate, a to-be-processed sensing result in the sensing result; and
   performing early warning processing on the to-be-processed sensing result to obtain the early warning result of the vehicle.

2. The method according to claim 1, wherein the determining, according to the sensing result and the preset early warning frame rate, the target early warning frame rate comprises:
   adjusting, according to the sensing result, the preset early warning frame rate to obtain the target early warning frame rate.

3. The method according to claim 2, wherein the preset early warning frame rate comprises a frame rate used for obstacle early warning;
   if a distance, comprised in the sensing result, from a moving sensed object to the vehicle is less than a preset value, increasing the frame rate used for obstacle early warning to obtain a target early warning frame rate used for obstacle early warning.

4. The method according to claim 2, wherein the preset early warning frame rate comprises a frame rate used for obstacle early warning;
   if a distance, comprised in the sensing result, from a moving sensed object to the vehicle is greater than a preset value, reducing the frame rate used for obstacle early warning to obtain a target early warning frame rate used for obstacle early warning.

5. The method according to claim 2, wherein the preset early warning frame rate comprises a frame rate used for preceding vehicle starting up early warning;
   if a distance, comprised in the sensing result, from a position of a preceding vehicle to the vehicle is greater than a starting up early warning preset value, reducing the frame rate used for preceding vehicle starting up early warning to obtain a target early warning frame rate used for preceding vehicle starting up early warning.

6. The method according to claim 2, wherein the preset early warning frame rate comprises a frame rate used for preceding vehicle starting up early warning;
   if a distance, comprised in the sensing result, from a position of a preceding vehicle to the vehicle is less than a starting up early warning preset value, increasing the frame rate used for preceding vehicle starting up early warning to obtain a target early warning frame rate used for preceding vehicle starting up early warning.

7. The method according to claim 2, wherein the preset early warning frame rate comprises a frame rate used for signal light early warning;
   if the sensing result comprises signal light information, increasing the frame rate used for signal light early warning to obtain a target early warning frame rate used for signal light early warning.

8. The method according to claim 2, wherein the preset early warning frame rate comprises a frame rate used for lane departure early warning;
   if the sensing result comprises curve road information, increasing the frame rate used for lane departure early warning to obtain a target early warning frame rate used for lane departure early warning.

9. The method according to claim 2, wherein both a first corresponding relationship between the vehicle traveling information and the preset sensing frame rate and a second corresponding relationship between the vehicle traveling information and the preset early warning frame rate are set in advance;
   the acquiring, according to the vehicle traveling information, both the preset sensing frame rate and the preset early warning frame rate corresponding to the vehicle traveling information comprises:
   acquiring the vehicle traveling information;
   acquiring, according to the first corresponding relationship, the preset sensing frame rate corresponding to the vehicle traveling information; and
   acquiring, according to the second corresponding relationship, the preset early warning frame rate corresponding to the vehicle traveling information.

10. The method according to claim 2, wherein the performing, according to the target early warning frame rate, early warning processing on the sensing result to obtain the early warning result of the vehicle comprises:
- determining, according to the target early warning frame rate, a to-be-processed sensing result in the sensing result; and
- performing early warning processing on the to-be-processed sensing result to obtain the early warning result of the vehicle.

11. The method according to claim 2, further comprising:
- determining, according to the early warning result, whether an early warning is required;
- if an early warning is required, displaying the early warning information comprised in the early warning result by utilizing a displayer, and/or broadcasting the early warning information comprised in the early warning result by way of voice.

12. The method according to claim 1, wherein both a first corresponding relationship between the vehicle traveling information and the preset sensing frame rate and a second corresponding relationship between the vehicle traveling information and the preset early warning frame rate are set in advance;
- the acquiring, according to the vehicle traveling information, both the preset sensing frame rate and the preset early warning frame rate corresponding to the vehicle traveling information comprises:
- acquiring the vehicle traveling information;
- acquiring, according to the first corresponding relationship, the preset sensing frame rate corresponding to the vehicle traveling information; and
- acquiring, according to the second corresponding relationship, the preset early warning frame rate corresponding to the vehicle traveling information.

13. The method according to claim 12, wherein if the vehicle traveling information comprises road information, the road information comprises any one of the following information:
- speed limiting information, road type information, road curvature information, slope information, and signal light information.

14. The method according to claim 13, wherein,
the acquiring the vehicle traveling information comprises:
- acquiring positioning information of the vehicle, and determining, according to the positioning information, a road where the vehicle is located; and
- determining the road information according to both the road where the vehicle is located and a preset high-precision map.

15. The method according to claim 1, further comprising:
- determining, according to the early warning result, whether an early warning is required;
- if an early warning is required, displaying the early warning information comprised in the early warning result by utilizing a displayer, and/or broadcasting the early warning information comprised in the early warning result by way of voice.

16. An electronic device, comprising:
at least one processor; and
a memory communicatively connected with the at least one processor; wherein, the memory stores instructions executable by the at least one processor, and the instructions are executed by the at least one processor to enable the at least one processor to:
- acquire, according to vehicle traveling information, both a preset sensing frame rate and a preset early warning frame rate corresponding to the vehicle traveling information;
- perform, according to the preset sensing frame rate, sensing processing on acquired sensor data to obtain a sensing result; wherein the sensor data is used for determining an environment around a vehicle; and
- determine, according to the sensing result and the preset early warning frame rate, a target early warning frame rate, and perform, according to the target early warning frame rate, early warning processing on the sensing result to obtain an early warning result of the vehicle, wherein the early warning result is used for outputting early warning information;

wherein the at least one processor is further configured to:
- determine, according to the preset sensing frame rate, part of the sensor data as to-be-processed sensing data;
- perform sensing processing on the to-be-processed sensing data to obtain the sensing result;
- determine, according to the target early warning frame rate, a to-be-processed sensing result in the sensing result; and
- perform early warning processing on the to-be-processed sensing result to obtain the early warning result of the vehicle.

17. A non-transitory computer-readable storage medium storing computer instructions, wherein the computer instructions are used to cause a computer to:
- acquire, according to vehicle traveling information, both a preset sensing frame rate and a preset early warning frame rate corresponding to the vehicle traveling information;
- perform, according to the preset sensing frame rate, sensing processing on acquired sensor data to obtain a sensing result; wherein the sensor data is used for determining an environment around a vehicle; and
- determine, according to the sensing result and the preset early warning frame rate, a target early warning frame rate, and perform, according to the target early warning frame rate, early warning processing on the sensing result to obtain an early warning result of the vehicle, wherein the early warning result is used for outputting early warning information;

wherein the computer instructions are further used to cause the computer to:
- determine, according to the preset sensing frame rate, part of the sensor data as to-be-processed sensing data;
- perform sensing processing on the to-be-processed sensing data to obtain the sensing result;
- determine, according to the target early warning frame rate, a to-be-processed sensing result in the sensing result; and
- perform early warning processing on the to-be-processed sensing result to obtain the early warning result of the vehicle.

* * * * *